US006856596B2

(12) United States Patent
Blumer et al.

(10) Patent No.: US 6,856,596 B2
(45) Date of Patent: Feb. 15, 2005

(54) APPROXIMATION OF THE WEIGHTED RANDOM EARLY DETECTION BUFFER ADMITTANCE ALGORITHM

(75) Inventors: Aric D. Blumer, Cranberry, PA (US); Timothy Dwight, Richardson, TX (US); Nhiem Nguyen, Cranberry, PA (US)

(73) Assignee: Marconi Communications, Inc., Warrendale, PA (US)

( * ) Notice: Subject to any disclaimer, the term of this patent is extended or adjusted under 35 U.S.C. 154(b) by 664 days.

(21) Appl. No.: 09/728,880

(22) Filed: Dec. 1, 2000

(65) Prior Publication Data

US 2002/0105908 A1 Aug. 8, 2002

(51) Int. Cl.⁷ .......................... G01R 31/08; H04L 12/28
(52) U.S. Cl. ...................... 370/230; 370/412; 710/56; 708/250
(58) Field of Search .................... 370/230, 231, 370/235, 412, 417, 401; 708/250; 710/52, 57, 29, 56

(56) References Cited

U.S. PATENT DOCUMENTS 6,092,115 A * 7/2000 Choudhury et al. ........ 709/235
6,438,101 B1 * 8/2002 Kalampoukas et al. ..... 370/229
6,556,578 B1 * 4/2003 Silberschatz et al. ....... 370/412

FOREIGN PATENT DOCUMENTS

WO WO 00 52882 A 9/2000

OTHER PUBLICATIONS

Goyal M. et al., "Effect of Number of Drop Precedences in Assured Forwarding," 1999 IEEE Global Telecommunications Conference, Globecom '99, p. 188–193, (Dec. 5, 1999).
Floyd, S. et al., "Random Early Detection Gateways for Congestion Avoidance," IEEE/ACM Transactions on Networking, IEEE, Inc. (New York), p. 397–413, (Aug. 1, 1993).
Clark D. D. et al., "Explicit Allocation of Best–Effort Packet Delivery Service," IEEE/ACM Transactions on Networking, IEEE, Inc. (New York), p. 362–373, (Aug. 1, 1998).
Makkar R. et al., "Empirical Study of Buffer Management Scheme for DiffServ Assured Forwarding PHB," Computer Communications and Networks, Proceedings. Ninth International Conference on Las Vegas, NV, USA, p. 632–637, (Oct. 16, 2000).

* cited by examiner

Primary Examiner—Duc Ho
(74) Attorney, Agent, or Firm—Ansel M. Schwartz

(57) ABSTRACT

An apparatus for storing a packet including a buffer in which packets are stored. The apparatus includes a mechanism for determining an average buffer fill of the buffer, where the average buffer fill is an average fill state of the buffer. The determining mechanism is connected to the buffer. The apparatus includes a mechanism for calculating a drop probability associated with the packet which identify is the probability the packet will be dropped from a the buffer. The apparatus includes a mechanism for generating a random number. The apparatus includes a mechanism for discarding the packet from the elements if the drop probability is greater in than the random number. A method for access control.

20 Claims, 5 Drawing Sheets

APPROXIMATION OF THE WEIGHTED RANDOM EARLY DETECTION BUFFER ADMITTANCE ALGORITHM

FIELD OF THE INVENTION

The present invention is related to active queue management. More specifically, the present invention is related to active queue management that calculates a drop probability of a packet that is received for storage in a buffer and compares the drop probability to a random number to determine if the packet should be discarded or not if an average buffer fill of the buffer is greater than a minimum threshold and less than a maximum threshold.

BACKGROUND OF THE INVENTION

Random Early Detection, or RED, is one of a class of mechanisms said to enable active queue management. Active queue management attempts to control buffer occupancy in a manner consistent with higher layer protocol dynamics. Motivations for such mechanisms are discussed in RFC-2309 "Recommendations on Queue Management and Congestion Avoidance in the Internet".

The alternative to active queue management is to simply let the buffer fill until it overflows. This is generally known as tail drop, since it is the latter part (tail) of a burst which is most often discarded. Early Packet Discard (EPD), which triggers discard prior to actual buffer overflow, is an ATM-specific optimization to the tail drop policy described here.

The most striking difference between RED and Tail Drop schemes, is that while the latter tends under congestion to maintain nearly-full buffers, RED attempts to keep buffers relatively empty. This represents a philosophical change, from viewing buffers as warehouses of bits with which to keep outgoing links busy during periods in which the arrival rate is less than the departure rate, to viewing their primary purpose to be burst absorption. This reflects both the nature of traffic on the Internet (a lot of which is bursty, even when aggregated), and an understanding of the way in which higher layer Internet protocols (specifically TCP) perceive and respond to, network capacity.

Positive effects of managing buffer occupancy via RED, include the following.

(1) Delay and delay variation are reduced through a reduction in queuing delay.

(2) Link utilization is increased due to the avoidance of state synchronization in the higher layer protocols controlling the rate at which individual sources transmit.

(3) Discrimination against bursty traffic sources is eliminated.

(4) Discrimination against flows spanning longer distances, is reduced.

RED was initially proposed in a paper by Floyd and Van Jacobson titled "Random Early Detection Gateways for Congestion Avoidance", in IEEE/ACM Transactions on Networking, V.1 N.4, August 1993, p. 397–413, available at http://www.aciri.org/floyd/papers/early.pdf. The algorithm defined in this paper supported only best-effort service. Cisco Systems also provides for RED.

Extension of RED to support differentiation of loss probability based on whether a flow conformed to its traffic contract, is discussed in Clark and Fang's paper "Explicit Allocation of Best Effort Delivery Service", available at http://diffserv.lcs.mit.edu/Papers/exp-alloc-ddc-wf.ps. This paper defines what is generally known as "RED with In and Out" (RIO). Nichols and Ibanez examine use of RIO to support an Assured Service.

For the present invention, RIO is extended from 2 markings ("colors") to three, to accommodate the 3-color marking proposed for the AF PHEs. This is referred to as Weighted RED (WRED). In systems where packets arrive every 2 clock cycles, the floating point calculations required for the WRED algorithm take too much time and are quite difficult to implement. The present invention involves an approximation of WRED using strict integer arithmetic and probability lookups.

SUMMARY OF THE INVENTION

The present invention pertains to an apparatus for storing a packet. The apparatus comprises a buffer in which packets are stored. The apparatus comprises a mechanism for determining an average buffer fill of the buffer, where the average buffer fill is an average fill state of the buffer. The determining mechanism is connected to the buffer. The apparatus comprises a mechanism for calculating a drop probability associated with the packet which identifies the probability the packet will be dropped from a the buffer. The apparatus comprises a mechanism for generating a random number. The apparatus comprises a mechanism for discarding the packet from the elements if the drop probability is greater in than the random number.

The present invention pertains to a method for access control. The method comprises the steps of receiving a packet at an element having a buffer. Then there is the step of determining if an average buffer fill of the buffer in which the packet is to be stored is greater than a minimum threshold and less than a maximum threshold, where the average buffer fill is an average fill state of the buffer. Next there is the step of calculating a drop probability associated with the packet which identifies a probability the packet will be dropped from the element. Then there is the step of comparing the drop probably to a random number. Next there is the step of discarding the packet from the element if the drop probability is greater than the random number.

BRIEF DESCRIPTION OF THE DRAWINGS

In the accompanying drawings, the preferred embodiment of the invention and preferred methods of practicing the invention are illustrated in which.

DETAILED DESCRIPTION

Figure 1:
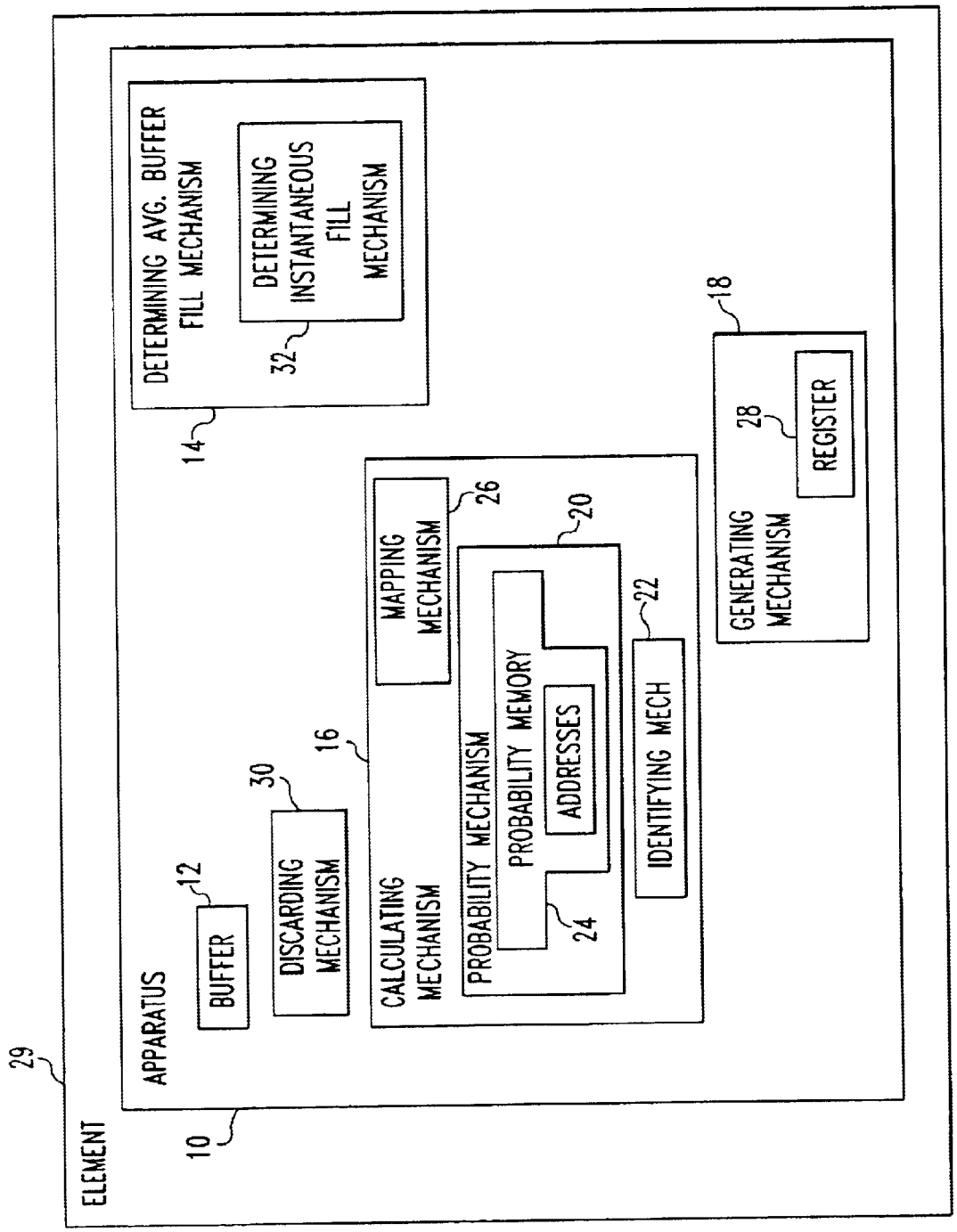
FIG. 1 is a schematic representation of the apparatus of the present invention.

Referring now to the drawings wherein like reference numerals refer to similar or identical parts throughout the several views, and more specifically to FIG. 1 thereof, there is shown an apparatus 10 for storing a packet. The apparatus 10 comprises a buffer 12 in which packets are stored. The apparatus 10 comprises a mechanism 14 for determining an average buffer fill of the buffer 12, where the average buffer fill is an average fill state of the buffer 12. The determining mechanism 14 is connected to the buffer 12. The apparatus 10 comprises a mechanism 16 for calculating a drop probability associated with the packet which identifies the probability the packet will be dropped from the buffer 12. The apparatus 10 comprises a mechanism 18 for generating a random number. The apparatus 10 comprises a mechanism 30 for discarding the packet from the elements 29 if the drop probability is greater in than the random number.

Preferably, the calculating mechanism 16 includes a probability mechanism 20 having predetermined drop probabilities from which the drop probability is obtained. The probability mechanism 20 preferably has a probability memory 24 having addresses and the calculating mechanism 16 includes a mechanism 22 for identifying an address in the probability memory 24 having the drop probability. Preferably, the calculating mechanism 16 includes a mechanism 26 for mapping values of variables into regions.

The random number generator mechanism preferably includes a linear feedback shift register 28 which approximates a random number generator. Preferably, the probability is defined as $$P_a(abf_{marking}) = \frac{P_b(abf_{marking})}{1 - count * p_b(abf_{marking})}$$

where $$p_b(abf_{marking}) = \left(\frac{\max\_p_{marking} \cdot (abf_{marking} - minth_{marking})}{maxth_{marking} - minth_{marking}}\right)$$

$$\left(\frac{pktsize}{maxPacket}\right) \cdot queue\_weight_{queue}$$

and $\max\_p_{marking}$, $maxth_{marking}$, $minth_{marking}$, $maxPacket$, and $queue\_weight_{queue}$ are constants. Preferably, $$abf_{marking,new} = \frac{(k_1 \cdot abf_{marking,old} + k_2 \cdot iqf_{marking})}{64}$$

where $k_1$ and $k_2$ are integers whose sum=64. The determining mechanism 14 preferably includes a mechanism 32 for determining the instantaneous queue fill.

The present invention pertains to a method for access control. The method comprises the steps of receiving a packet at an element 29 having a buffer 12. Then there is the step of determining if an average buffer fill of the buffer 12 in which the packet is to be stored is greater than a minimum threshold and less than a maximum threshold, where the average buffer fill is an average fill state of the buffer 12. Next there is the step of calculating a drop probability associated with the packet which identifies a probability the packet will be dropped from the element 29. Then there is the step of comparing the drop probably to a random number. Next there is the step of discarding the packet from the element 29 if the drop probability is greater than the random number.

Preferably, the calculating step includes the step of retrieving the drop probability from a probability memory 24 having precomputed drop probabilities. The calculating step preferably includes before the retrieving step the step of identifying an address in the probability memory 24 of the drop probability. Preferably, the identifying the address step includes the step of mapping values of variables into at least two regions.

The identifying the address step preferably includes after the mapping step the step of determining the address from the variables. Preferably, the mapping step includes the step of mapping of variables into at least two regions by comparing them with a programable thresholds. The comparing step preferably includes the step of comparing the drop probability to the random number generated by a linear feedback shift register 28 which approximates a random number generator.

Preferably, the variables includes count since last drop, packet size, average buffer fill, color and queue, respectively. The regions preferably include count_region, pktsize_region, abf_region, color and queue derived from the variables count since last drop, packet size, average buffer fill, color and queue, respectively. Preferably, the discarding step includes the step of discarding a packet every 2 clock cycles.

The element 29 preferably includes a reassembler for sending packets to a network. Preferably, the probability is defined as $$P_a(abf_{marking}) = \frac{P_b(abf_{marking})}{1 - count * p_b(abf_{marking})}$$

where $$p_b(abf_{marking}) = \left(\frac{\max\_p_{marking} \cdot (abf_{marking} - minth_{marking})}{maxth_{marking} - minth_{marking}}\right)$$

$$\left(\frac{pktsize}{maxPacket}\right) \cdot queue\_weight_{queue}$$

and $\max\_p_{marking}$, $maxth_{marking}$, $minth_{marking}$, $maxPacket$, and $queue\_weight_{queue}$ are constants. Preferably, $$abf_{marking,new} = \frac{(k_1 \cdot abf_{marking,old} + k_2 \cdot iqf_{marking})}{X}$$

where $k_1$ and $k_2$ are integers whose sum=X. Preferably, X=64.

Figure 2:
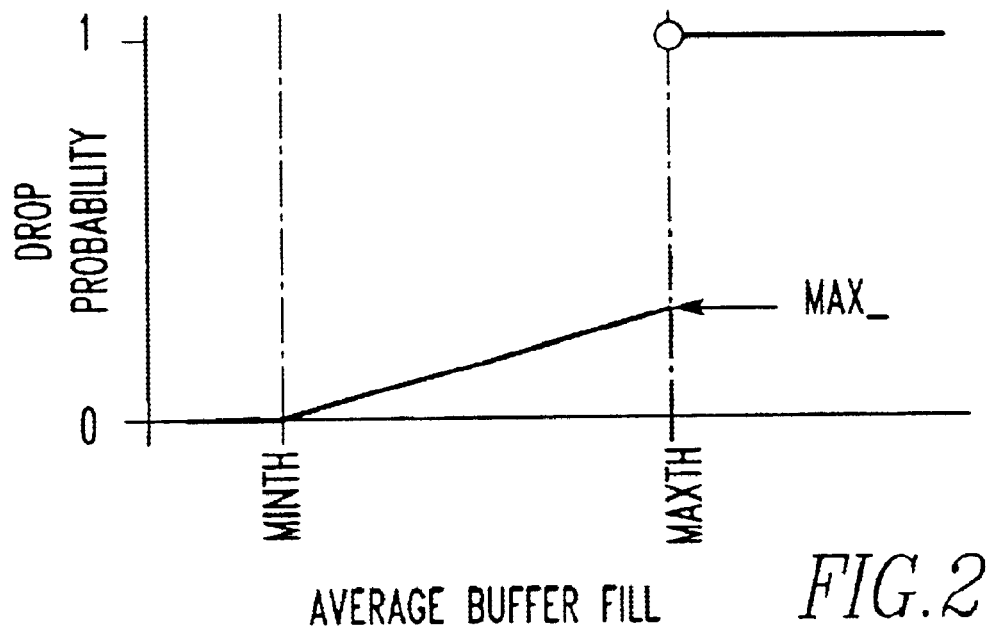
FIG. 2 is a graph of the probability function of the RED algorithm.
Figure 3:
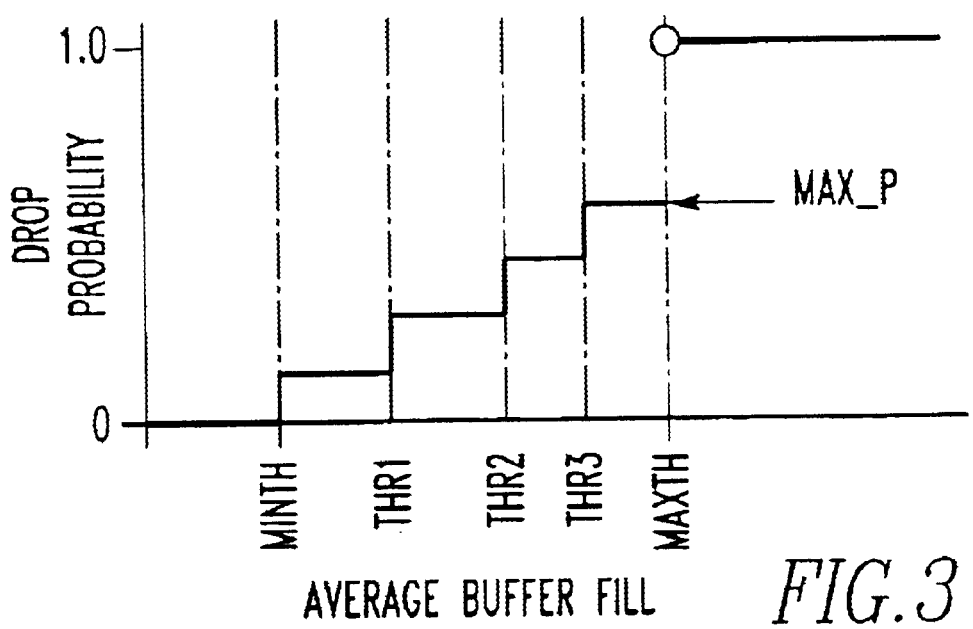
FIG. 3 is a graph of the WRED Stair-Step approximation.

In the operation of the invention, there are two thresholds used to determine when a packet should be considered for dropping. In the equations shown below, these thresholds are labeled minth and maxth, for minimum threshold and maximum threshold, respectively. These thresholds are compared to the average buffer fill (abf) to determine the drop probability. If abf is below minth, then the packet under consideration will not be dropped (dropped with a probability of 0.0). If the abf is above maxth, then the packet will definitely be dropped (dropped with a probability of 1.0). When the value of abf falls between maxth and minth, then a drop probability is calculated for the packet. The farther above minth the abf falls, the greater the probability of dropping. There are other factors that affect this probability as well. They are the number of packets received since the last drop, the marking (DiffServ color) of the packet, and what queue the packet belongs to. FIG. 2 shows the probability function of the basic weighted RED operation. FIG. 3 shows the probability function of the approximation herein without influences from packet size, count since last drop, queue, and color.

The calculated probability is compared to a random number, and if the drop probability is greater, the packet is discarded. Otherwise, the packet is kept. The average buffer fill is calculated either on every packet entrance into the system, or on a periodic basis. It is an exponentially weighted moving average that allows the system to handle bursts of traffic without dropping.

Let $abf_{marking}$ be the exponentially weighted moving average buffer occupancy applicable to packets with marking=marking Let $iqf_Q$ be the instantaneous queue fill of the queue to which the packet belongs, and $min_Q$, be the guaranteed minimum buffer space for this queue.

Let pktsize be the size of the arriving packet, in bytes.

Let max_$p_{marking}$ be the configured drop probability when abf$_{marking}$ reaches R$_{marking,2}$ Let maxPacket be the configured maximum packet size (Max-Packet serves to weight the discard probability proportionally to packet size.)

Let count be the number of packets enqueued since the last packet was dropped

The Average Buffer Fill Function:

$$abf_{marking,new} = (1-weight) \cdot abf_{marking,old} + weight \cdot iqf_{marking}$$

The calculation of abf$_{marking}$ is a floating point operation to calculate the exponential weighted moving average of the fill state of the buffer 12. weight is a value between 0 and 1.0, inclusive. The weight parameter controls the smoothing of the average, and iqf$_{marking}$ is the instantaneous queue fill, or the instantaneous measure of the buffer 12 in use by packets classified with marking. The closer to 1.0 the weight becomes, the more closely the average follows the instantaneous.

The Probability Function:

These formulas express the drop probability ($p_a$) of a packet when the average buffer fill is between the minth and maxth thresholds.

$$P_a(abf_{marking}) = \frac{P_b(abf_{marking})}{1 - count * p_b(abf_{marking})}$$

$$p_b(abf_{marking}) = \left( \frac{max\_p_{marking} \cdot (abf_{marking} - minth_{marking})}{maxth_{marking} - minth_{marking}} \right)$$

$$\left( \frac{pktsize}{maxPacket} \right) \cdot queue\_weight_{queue}$$

This drop probability for a packet of a given marking and queue is a function of several constants (max_$p_{marking}$, maxth$_{marking}$, minth$_{marking}$, maxPacket, and queue_weight$_{queue}$) and three variables (count, abf$_{marking}$, and pktsize). The resulting probability is a number between 0 and 1.0, inclusive. queue_weight$_{queue}$ is also a number between 0 and 1.0, inclusive, and abf$_{marking}$ is the floating point number calculated as shown above. The remaining parameters are integers. There are three possible values for marking, and there are 16 possible values for queue in this implementation. If iqf$_Q$<min$_Q$, the drop probability is always 0.0.

The requirements of the system are that it must be able to handle a packet every two clock cycles. Therefore, it must be able to complete a WRED probability decision every two clock cycles. The algorithm could be implemented using floating point with a deep pipeline, but doing floating point calculations in hardware is expensive both in gate-count as well as time. A purely integer approximation of the abf$_{making}$ and $p_a$ (abf$_{marking}$) based on a computational approximation of abf$_{marking}$ and a lookup approximation of $p_a$ (abf$_{marking}$) is implemented.

The computational approximation for abf$_{marking}$ is as follows:

$$abf_{marking,new} = \frac{(k_1 \cdot abf_{marking,old} + k_2 \cdot iqf_{marking})}{64}$$

Note that $k_1 + k_2$ will always equal 64.

The parameters $k_1$ and $k_2$ are integers whose sum must equal 64, and the divide by 64 is simply a shift by 5 bits in the implementation. The multiplies can be done in a single cycle and in parallel. The following add and shift can also be accomplished in a single cycle.

Since the goal of the approximation is to eliminate floating point calculations, the first step in the probability lookup approximation is to normalize the probability range of 0.0 to 1.0, inclusive, to the integer range 0 to 255, inclusive. The probability is now an 8-bit unsigned integer. The approximation further takes advantage of the constants within the probability calculations above by allowing a software program to precompute probability values for combinations of the variables shown above with these constants. One further approximation is required, however, because each of the variables has thousands of states, making storage of all precomputed values prohibitive. This last approximation, therefore, is to map the values of the variables into regions by comparing them with programmable thresholds to reduce the number of possible combinations.

For example, suppose that all the variables (count, abf$_{marking}$, and pktsize) are integer values in the range [0, 1023]. All possible combinations of these values would require $1024^3$, or 1,073,741,824 entries. The solution, therefore, is to map each of these values, based upon thresholds, to one of 4 regions. The new variables become count_region, abf_region$_{marking}$, and pktsize_region. The result is that storage is only needed for all combinations of the regions rather than all combinations of the variables. That is $4^3$, or 64 entries. When two more degrees of freedom (color with three possible values and queue with 16 possible values) are taken into consideration, there are a total of 3*16*64, or 3072 entries of 8 bit integers. The concept extends to a higher precision. For example, if it is desired to map the three variables above to 8 regions each, then there are a total of $3*16*8^3$, or 24,576 entries.

Each of the variables (count_region, abf_region$_{marking}$, pktsize_region, color, and queue) become indexes into the five-dimensional probability array to complete the lookup approximation. For each combination of these variables, software will precompute what the drop probability will be.

In the hardware implementation, then, only one computation needs to be made, and this is the pktsize_region. The count_region is simply the upper two bits of the count-since-last-drop counter and requires no computation. The abf_region$_{marking}$ is computed in the background periodically and is already available when the packet arrives. The color is determined from the packet itself, and the queue to which the packet belongs is obtained from a packet flow identifier (such as VPI and VCI or an IP header) through a lookup. These five parameters are used to form an address into the precomputed probability memory 24, and the probability of the packet is retrieved. Finally, this probability is compared to the output of a Linear Feedback Shift Register 28 which approximates a random number generator, to determine if the packet should be dropped. All of this is accomplished in 6 clock cycles which are pipelined to complete a decision every 2 cycles.

The parameters used by the WRED implementation described above, are summarized in the following table. These are the parameters for the non-approximation of WRED. The ones that directly (√) apply to the approximation have been tagged and explanations for those that indirectly apply.

| | Parameter | Description | Default |
|---|---|---|---|
| Per port maps to 3 thresholds | maxPacket | The largest packet likely to be encountered | interface MTU |
| | avgPacket | The expected average packet size | 256 bytes |
| Per port + marking | weight ↓ maps to integer values $k_1$ and $k_2$ | Used in the computation of exponentially weighted moving average of buffer occupancy | 0.002 if "inline" method is used 0.012 if "periodic" method is used |
| | ✓Minth | Drop threshold below which probability of intentional discard is zero. | three thresholds here to implement stair-step |
| | ✓Maxth | Drop threshold above which probability of intentional discard is 100%. | |
| | max_p ↘ used to precompute probability memory | Maximum value for $P_b$ | 0.12 - red 0.10 - yellow 0.08 - green |
| Per port + queue | ✓Min | Per-queue guaranteed buffer space | |
| Per port | 3 pktsize thresholds | | |

Figure 4:
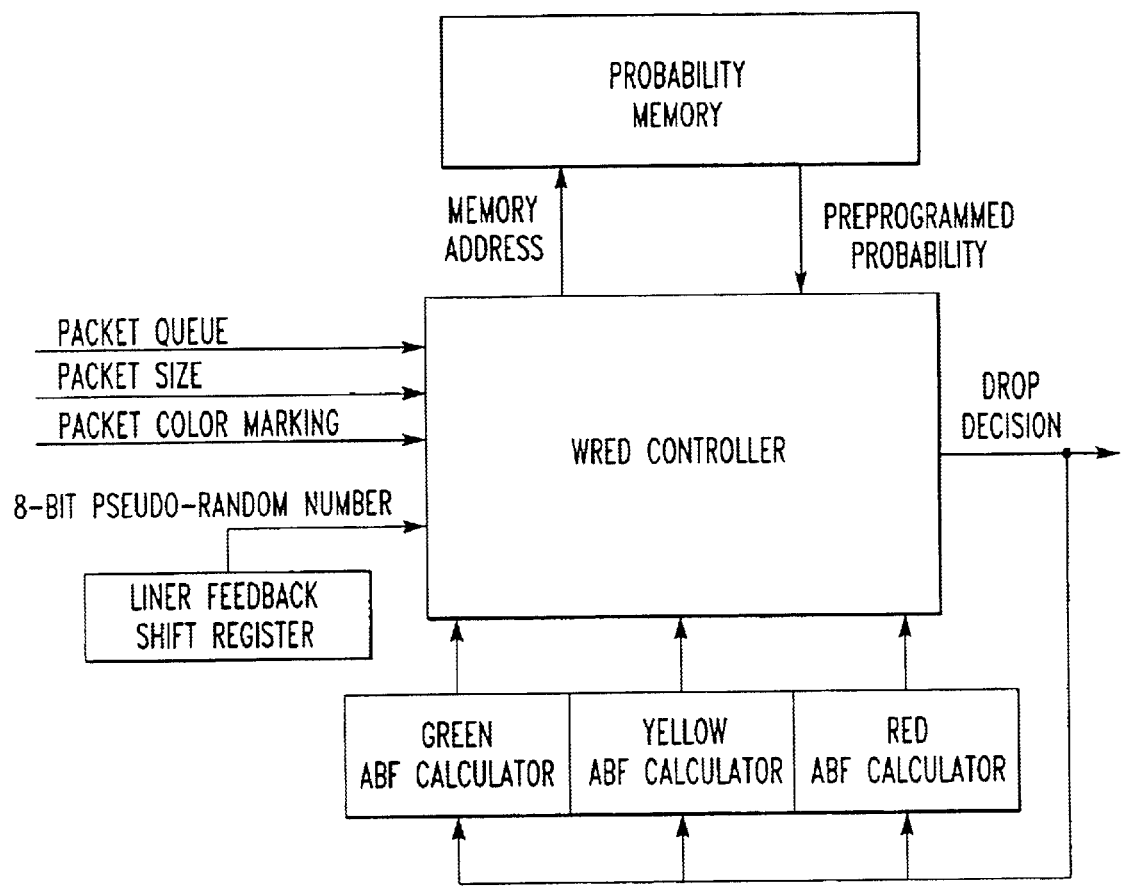
FIG. 4 is a schematic representation of a block diagram of the implementation of the apparatus of the present invention.

FIG. 4 shows a block diagram overview of the implementation herein.

Figure 5:
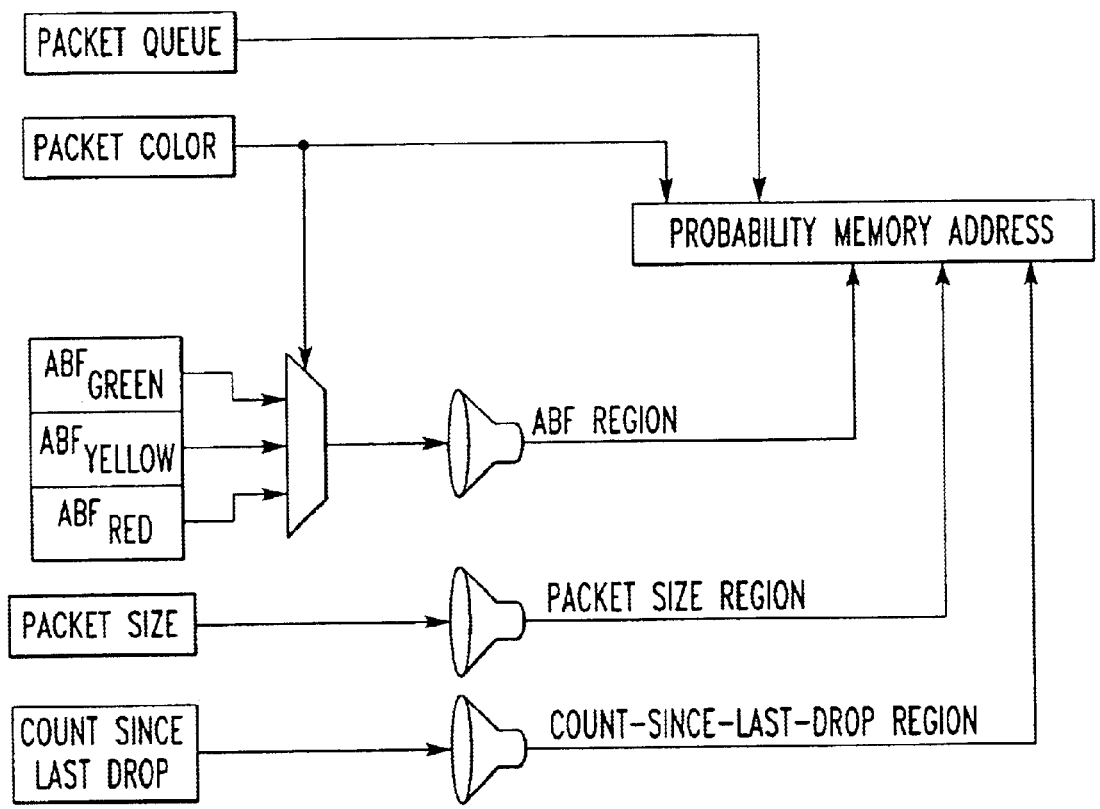
FIG. 5 is a schematic representation of a block diagram of the probability memory address formation.

FIG. 5 is a block diagram of the probability memory address formation.

Figure 6:
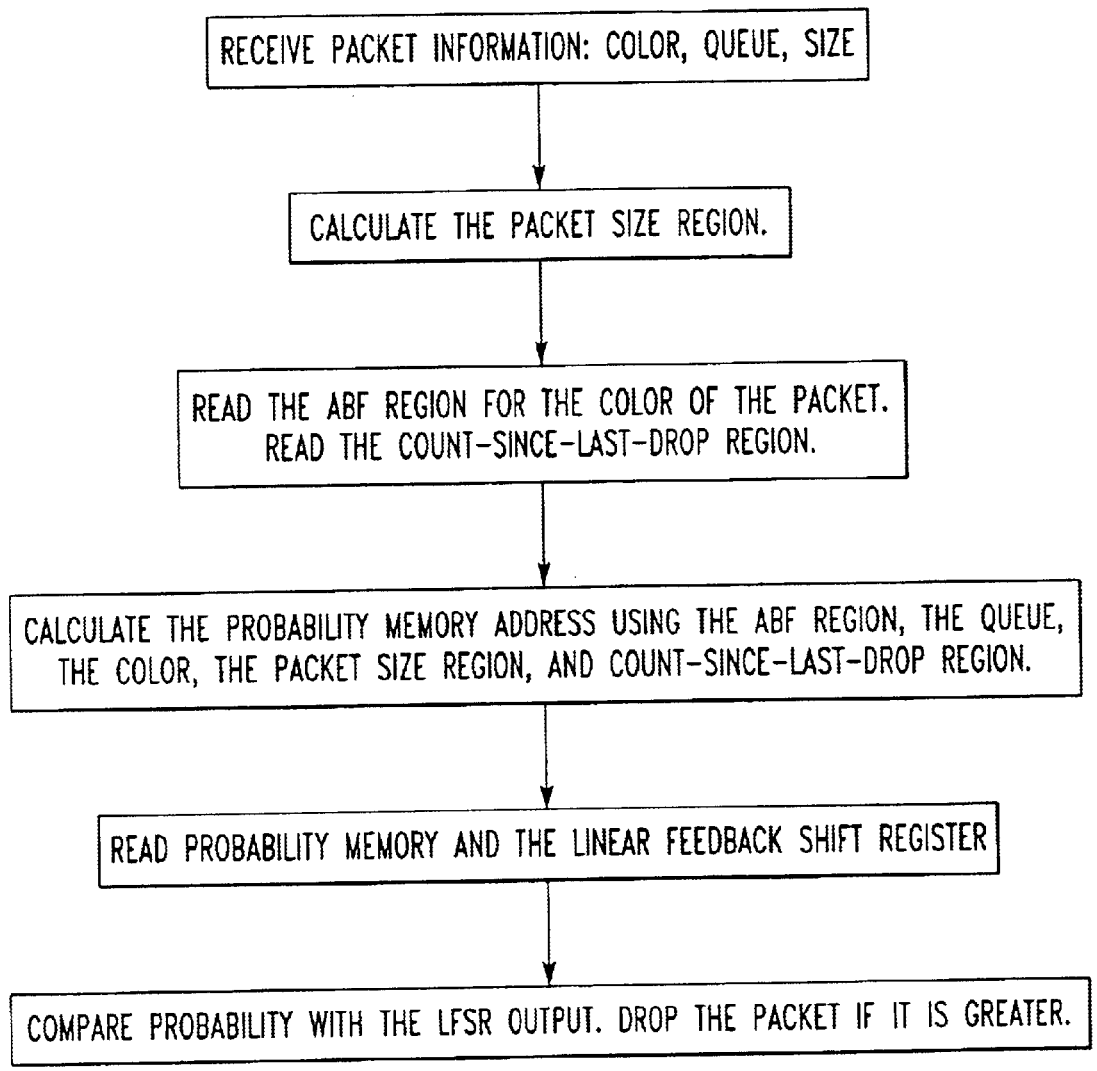
FIG. 6 is a flow chart of the algorithm of the present invention.

FIG. 6 is a flow chart of WRED implementation.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A method for access control comprising the steps of:
receiving a packet at an element having a buffer;
determining if an average buffer fill of the buffer in which the packet is to be stored is greater than a minimum threshold and less than a maximum threshold, where the average buffer fill is an average fill state of the buffer;
calculating a drop probability associated with the packet which identifies a probability the packet will be dropped from the element in regard to whether the average buffer fill is greater than the minimum threshold and less than the maximum threshold;
comparing the drop probability to a random number; and
discarding the packet from the element if the drop probability is greater than the random number, wherein the calculating step includes the step of retrieving the drop probability from a probability memory having precomputed drop probabilities.

2. A method as described in claim 1 wherein the calculating step includes before the retrieving step the step of identifying an address in the probability memory of the drop probability.

3. A method as described in claim 2 wherein the identifying the address step includes the step of mapping values of variables into at least two regions.

4. A method as described in claim 3 wherein the identifying the address step includes after the mapping step the step of determining the address from the variables.

5. A method as described in claim 4 wherein the mapping step includes the step of mapping of variables into at least two regions by comparing them with a programmable thresholds.

6. A method as described in claim 5 wherein the comparing step includes the step of comparing the drop probability to the random number generated by a linear feedback shift register which approximates a random number generator.

7. A method as described in claim 6 wherein the variables includes count since last drop, packet size, average buffer fill, color and queue, respectively.

8. A method as described in claim 7 wherein the regions include count_region, pktsize_region, abf_region, color and queue derived from the variables count since last drop, packet size, average buffer fill, color and queue, respectively.

9. A method as described in claim 8 wherein the discarding step includes the step of discarding a packet every 2 clock cycles.

10. A method as described in claim 9 wherein the element includes a reassembler for sending packets to a network.

11. A method as described in claim 9 wherein the probability is defined as $$P_a(abf_{marking}) = \frac{p_b(abf_{marking})}{1 - count * p_b(abf_{marking})}$$

where $$p_b(abf_{marking}) = \left(\frac{\text{max\_}p_{marking} \cdot (abf_{marking} - minth_{marking})}{maxth_{marking} - minth_{marking}}\right)$$

$$\left(\frac{pktsize}{maxPacket}\right) \cdot \text{queue\_weight}_{queue}$$

and max_$p_{marking}$, maxth$_{marking}$, minth$_{marking}$, maxPacket, and queue_weight$_{queue}$ are constants.

12. A method as described in claim 11 wherein the $$abf_{marking, new} = \frac{(k_1 \cdot abf_{marking, old} + k_2 \cdot iqf_{marking})}{X}$$

where $k_1$ and $k_2$ are integers whose sum=X.

13. A method as described in claim 12 wherein X=64.

14. An apparatus for storing a packet comprising:
a buffer in which packets are stored;
a mechanism for determining an average buffer fill of the buffer, where the average buffer fill is an average fill state of the buffer, the determining mechanism is connected to the buffer;
a mechanism for calculating a drop probability associated with the packet which identifies the probability the packet will be dropped from the buffer in regard to whether the average buffer fill is greater than the minimum threshold and less than the maximum threshold; and
a mechanism for generating a random number; and
a mechanism for discarding the packet from the elements if the drop probability is greater in than the random number, wherein the calculating mechanism includes a probability mechanism having predetermined drop probabilities from which the drop probability is obtained.

15. An apparatus as described in claim 14 wherein the probability mechanism has a probability memory having addresses and the calculating mechanism includes a mechanism for identifying an address in the probability memory having the drop probability.

16. An apparatus as described in claim 15 wherein the calculating mechanism includes a mechanism for mapping values of variables into regions.

17. An apparatus as described in claim 16 wherein the random number generating mechanism includes a linear feedback shift register which approximates a random number generator.

18. An apparatus as described in claim 17 wherein the probability is defined as $$P_a(abf_{marking}) = \frac{p_b(abf_{marking})}{1 - count * p_b(abf_{marking})}$$

where $$p_b(abf_{marking}) = \left(\frac{\max\_p_{marking} \cdot (abf_{marking} - minth_{marking})}{maxth_{marking} - minth_{marking}}\right)$$

$$\left(\frac{pktsize}{maxPacket}\right) \cdot queue\_weight_{queue}$$

and $\max\_p_{marking}$, $maxth_{marking}$, $minth_{marking}$, maxPacket, and $queue\_weight_{queue}$ are constants.

19. An apparatus as described in claim 18 wherein the $$abf_{marking, new} = \frac{(k_1 \cdot abf_{marking, old} + k_2 \cdot iqf_{marking})}{64}$$

where $k_1$ and $k_2$ are integers whose sum=64.

20. An apparatus as described in claim 18 wherein the determining mechanism includes a mechanism for determining the instantaneous queue fill.

\* \* \* \* \*

UNITED STATES PATENT AND TRADEMARK OFFICE
CERTIFICATE OF CORRECTION

PATENT NO. : 6,856,596 B2
APPLICATION NO. : 09/728880
DATED : February 15, 2005
INVENTOR(S) : Blumer et al.

It is certified that error appears in the above-identified patent and that said Letters Patent is hereby corrected as shown below:

In Column 2, Line 5, delete "PHEs." and insert -- PHBs. --, therefor.

In Column 5, Line 52, delete "$abf_{making}$" and insert -- $abf_{marking}$ --, therefor.

In Column 7, in Table, under "Parameter", Line 9, delete "$max_p$" and insert -- $max\_p$ --, therefor.

Signed and Sealed this

Fourteenth Day of October, 2008

JON W. DUDAS
*Director of the United States Patent and Trademark Office*